US011378764B2

(12) United States Patent
Zhou et al.

(10) Patent No.: US 11,378,764 B2
(45) Date of Patent: Jul. 5, 2022

(54) OPTICAL MODULE

(71) Applicant: InnoLight Technology (Suzhou) LTD., Jiangsu (CN)

(72) Inventors: Jie Zhou, Jiangsu (CN); Kewu Wang, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 16/855,061

(22) Filed: Apr. 22, 2020

(65) Prior Publication Data
US 2020/0341219 A1 Oct. 29, 2020

(30) Foreign Application Priority Data

Apr. 23, 2019 (CN) .......................... 201910327793.0

(51) Int. Cl.
*G02B 6/42* (2006.01)
(52) U.S. Cl.
CPC .......... *G02B 6/4292* (2013.01); *G02B 6/428* (2013.01); *G02B 6/4256* (2013.01)
(58) Field of Classification Search
CPC .. G02B 6/4201; G02B 6/4246; G02B 6/4275; G02B 6/4292; G02B 6/428; G02B 6/4256; H01R 13/627

USPC ...................................................... 385/88–92
See application file for complete search history.

(56) References Cited

U.S. PATENT DOCUMENTS

| 7,941,053 | B2 * | 5/2011 | Dallesasse | ............. | H04B 10/40 |
| | | | | | 398/139 |
| 9,553,671 | B1 * | 1/2017 | Nagarajan | ............. | G02B 6/4246 |
| 2005/0018979 | A1 | 1/2005 | Mizue et al. | | |
| 2012/0269486 | A1 | 10/2012 | Ishii | | |
| 2017/0059798 | A1 | 3/2017 | Ritter et al. | | |

FOREIGN PATENT DOCUMENTS

| CN | 102656496 B | 1/2015 | |
| CN | 109061811 | * 12/2018 | .......... G02B 6/4236 |
| CN | 109061811 A | 12/2018 | |
| GB | 2 239 104 A | 6/1991 | |

* cited by examiner

*Primary Examiner* — Michael P Mooney
(74) *Attorney, Agent, or Firm* — Finnegan, Henderson, Farabow, Garrett & Dunner, LLP

(57) ABSTRACT

An optical module includes a housing including an optical interface, a circuit board module disposed in the housing, a fiber optic receptacle module disposed in the housing and including a plurality of fiber optic receptacles, and an optoelectronic chip disposed in the housing and electrically connected to the circuit board module. The plurality of fiber optic receptacles are connected together and are installed at the optical interface.

15 Claims, 4 Drawing Sheets

OPTICAL MODULE

CROSS-REFERENCE TO RELATED APPLICATION

This application is based upon and claims priority to Chinese Patent Application 201910327793.0, filed on Apr. 23, 2019, the entire content of which is incorporated herein by reference.

FIELD OF THE DISCLOSURE

The present application relates to the field of optical communications and more particularly to an optical module.

BACKGROUND

As demand for the quantity of information increases, demand for optical communications networks also increases. As a result, the size of optical modules is made smaller, the arrangement of channels is increasingly dense, and a greater number of optical interfaces are needed for optical signal transmission. At present, multiple fiber optic receptacles are typically assembled sequentially into the optical interface of a housing in the process of assembling optical modules featuring multiple optical interfaces, especially printed circuit board assemblies (PCBA) and optical interfaces in structures that use fiber optic jumper connection modules, and the assembly work is complicated and inefficient.

SUMMARY

Purposes of the present disclosure include providing an optical module in which fiber optic receptacles are easy and efficient to assemble.

To achieve one or more of the aforementioned purposes, one embodiment of the present disclosure provides an optical module including a housing including an optical interface, a circuit board module disposed in the housing, a fiber optic receptacle module disposed in the housing and including a plurality of fiber optic receptacles, and an optoelectronic chip disposed in the housing and electrically connected to the circuit board module. The plurality of fiber optic receptacles are connected together and the fiber optic receptacles connected together are installed at the optical interface.

Another embodiment of the present disclosure provides an optical module assembly method, including the following steps:

providing a circuit board module, an optoelectronic chip, a fiber optic receptacle module, and a housing, the fiber optic receptacle module including a plurality of fiber optic receptacles connected together, and the housing including a lower housing and an upper lid and having an optical interface and an electrical interface;

electrically connecting the optoelectronic chip to the circuit board module, optically coupling the fiber optic receptacle module to the optoelectronic chip, installing the circuit board module to an end of the lower housing near the electrical interface, inserting the plurality of fiber optic receptacles connected together into the optical interface, and securing the fiber optic receptacles at the optical interface; and placing the upper lid over the lower housing.

DETAILED DESCRIPTION

Figure 1:
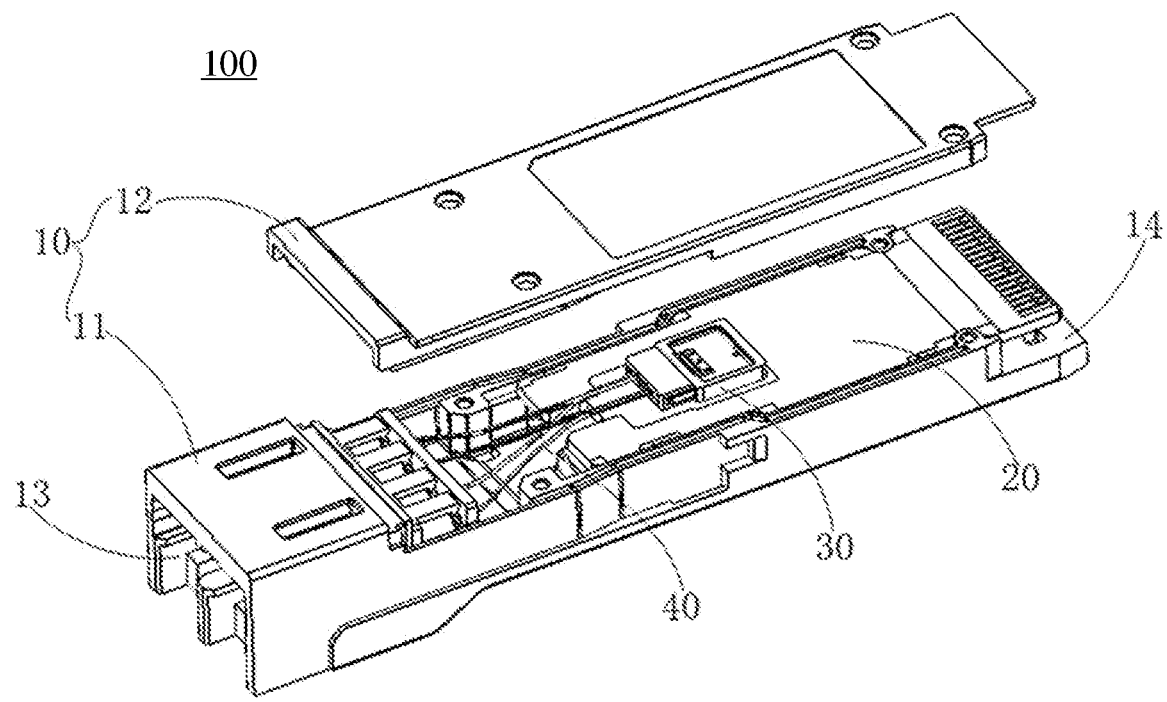
FIG. 1 is a structural schematic view of an optical module consistent with an embodiment of the present disclosure.

The text below provides a detailed description of the present disclosure with reference to specific embodiments illustrated in the attached drawings. However, these embodiments do not limit the present disclosure; the scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present disclosure are only for the purpose of illustrating the basic structure of the subject matter of the present disclosure.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When an element or layer is said to be "above" another component or layer or "connected to" another component or layer, it may be directly above the other component or layer or directly connected to the other component or layer, or there may be an intermediate element or layer.

FIG. 1 is a structural schematic view of an optical module 100 consistent with an embodiment of the present disclosure. As illustrated in FIG. 1, the optical module 100 includes a housing 10, and a circuit board module (printed circuit board assembly) and optical elements disposed in the housing 10. The circuit board module includes a circuit board 20 and one or more electronic devices (not shown in FIG. 1) disposed on the circuit board 20. The housing 10 has an optical interface 13 and an electrical interface 14, and includes a lower housing 11 and an upper lid 12. The lower housing 11 including two opposing side walls. The optical elements include an optoelectronic chip 31 (shown in FIG. 2) disposed on the circuit board 20, a lens and/or a wavelength division multiplexer 30 disposed on an optical path of the optoelectronic chip 31, and a fiber optic assembly 40 that transmits light signals.

First Example Embodiment

Figure 2:
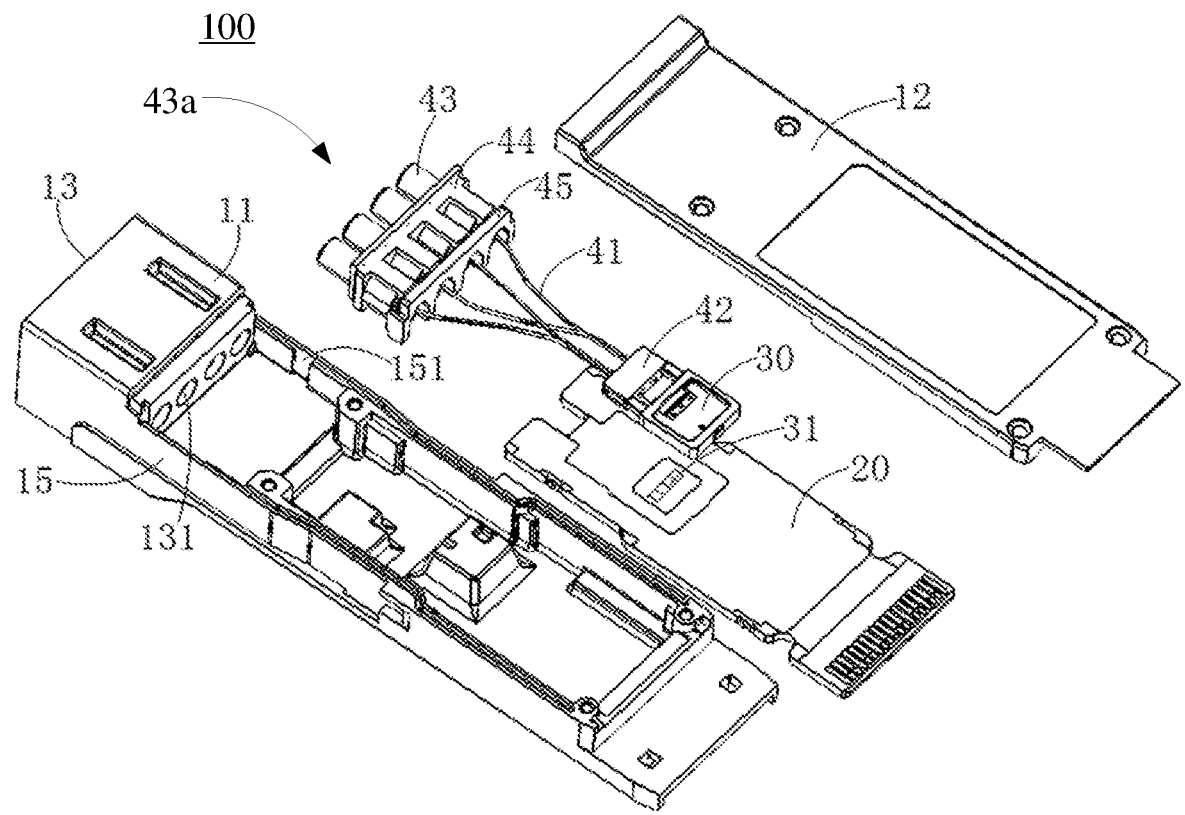
FIG. 2 is an exploded structural schematic view of an optical module consistent with a first example embodiment of the present disclosure.
Figure 3:
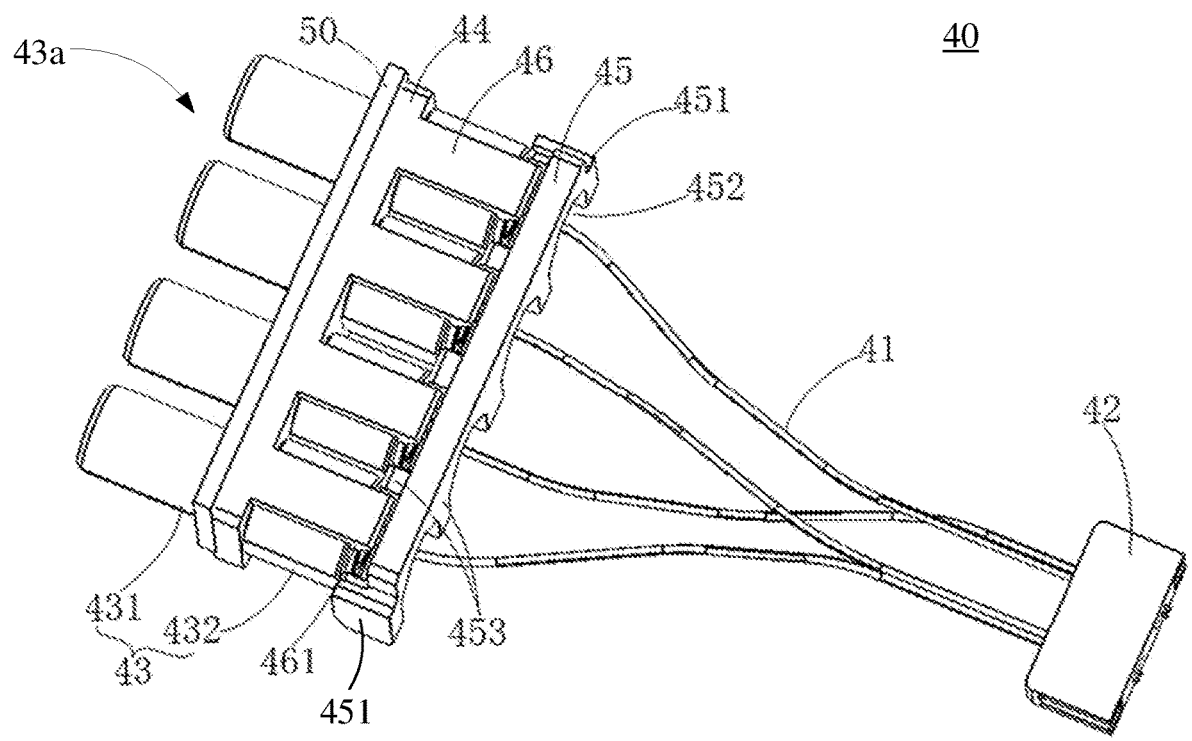
FIG. 3 is a structural schematic view of a fiber optic assembly consistent with the first example embodiment of the present disclosure.
Figure 4:
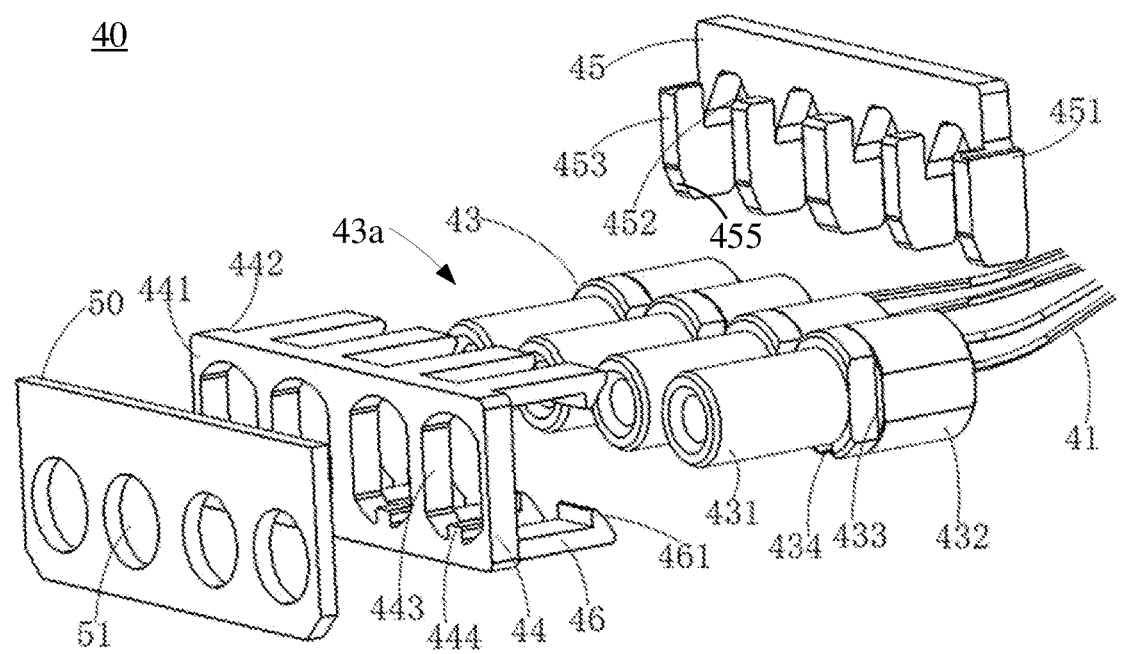
FIG. 4 is an exploded structural schematic view of the fiber optic receptacle module in FIG. 3.
Figure 5:
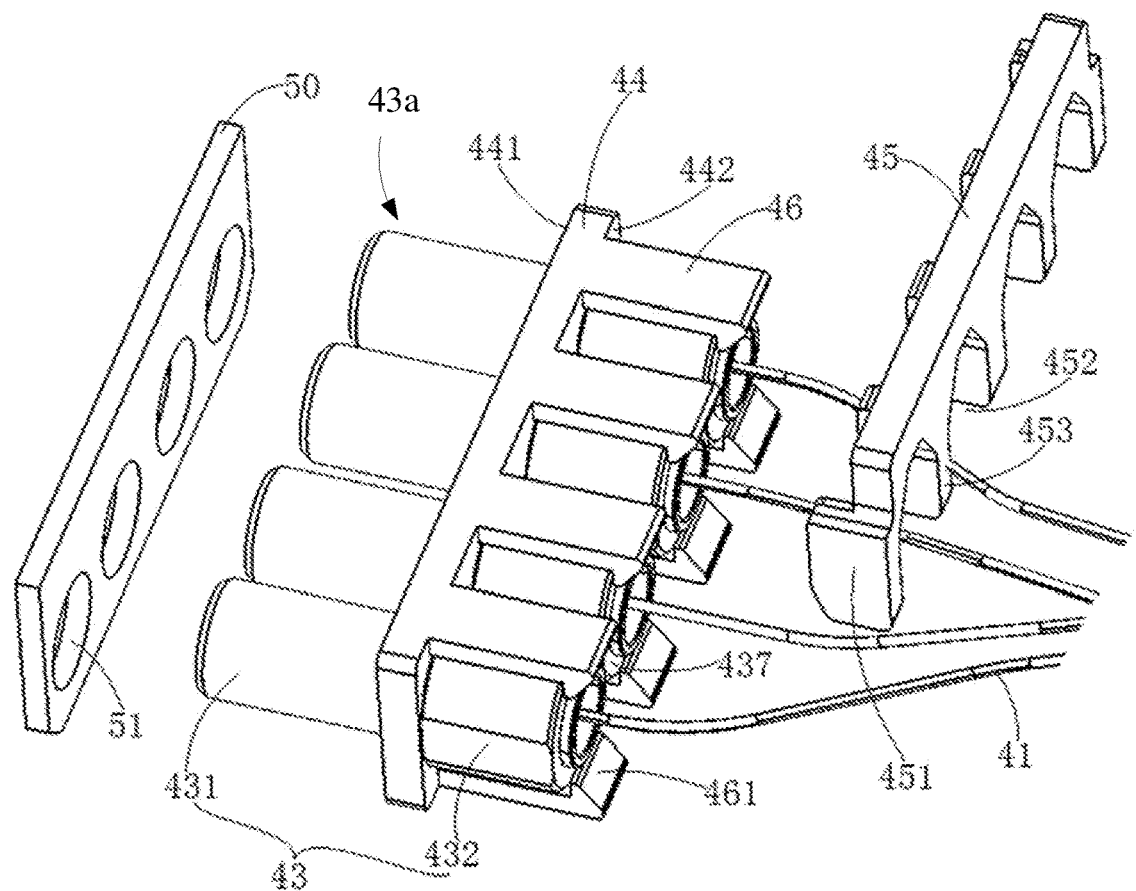
FIG. 5 is a schematic view illustrating one way of connection for fiber optic receptacles, consistent with the first example embodiment of the present disclosure.
Figure 6:
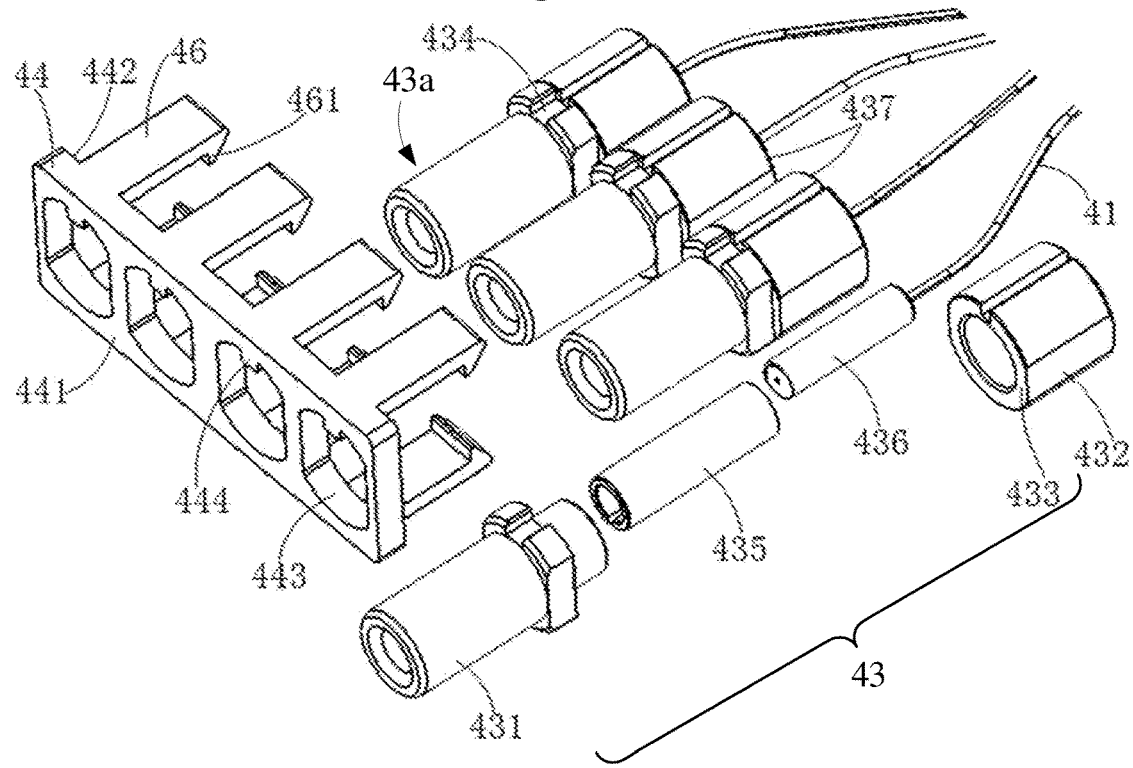
FIG. 6 is a structural schematic view of fiber optic receptacles and snap-fit claws, consistent with the first example embodiment of the present disclosure.

FIG. 2 is an exploded structural schematic view of the optical module 100 consistent with a first example embodiment of the present disclosure. FIG. 3 is a structural schematic view of the fiber optic assembly 40 consistent with the first example embodiment of the present disclosure. FIG. 4 is an exploded structural schematic view of a fiber optic receptacle module in FIG. 3, consistent with the first example embodiment of the present disclosure. FIG. 5 is a schematic view illustrating a method of connecting fiber optic receptacles, consistent with the first example embodiment of the present disclosure. FIG. 6 is a structural schematic view of fiber optic receptacles and snap-fit claws, consistent with the first example embodiment of the present disclosure.

As shown in FIGS. 2 and 3, the fiber optic assembly 40 primarily includes a plurality of optical fibers 41, as well as a coupling end 42 and a fiber optic receptacle 43 disposed respectively on opposite ends of each of the optical fibers 41. The coupling ends 42 are optically coupled to the optoelectronic chip 31 installed on the circuit board 20. For example, the coupling ends 42 are coupled to the optoelectronic chip 31 by means such as the lens and/or the wavelength division multiplexer 30 disposed on the optical path. The fiber optic receptacles 43 are installed at the optical interface 13 of the housing 10 to transmit optical signals between the optoelectronic chip 31 and the optical interface 13. In the first example embodiment, the coupling ends 42 of the plurality of optical fibers 41 are integrated onto a multi-fiber push on (MPO) connector, and are connected directly to the lens and/or the wavelength division multiplexer 30 that are integrated together. The plurality of fiber optic receptacles 43 respectively corresponding to the plurality of optical fibers 41 are connected together to form a fiber optic receptacle module 43a, which is installed at the optical interface 13 of the housing 10. Here, each of the fiber optic receptacles 43 includes an outer tube and a fiber optic insertion core disposed in the outer tube. Specifically, as shown in FIG. 6, each fiber optic receptacle 43 includes the outer tube that includes a receptacle front end 431 and a receptacle back end 432, as well as a sleeve 435 and a fiber optic insertion core 436 disposed in the outer tube. As shown in FIG. 2, the optical interface 13 of the housing 10 includes a plurality of through holes 131 respectively corresponding to the outer tubes of the fiber optic receptacles 43. The fiber optic receptacles 43 are connected together and inserted together as a whole into the optical interface 13 of the housing 10. The receptacle front ends 431 of the outer tubes of the fiber optic receptacles 43 fit through their respective through holes 131 at the optical interface 13 to be connected to external fiber optic connectors. The optical interface 13 and the lower housing 11 are a one-piece structure. In other example embodiments, the optical interface 13 may be separable from the lower housing 11 and may be secured and installed on the lower housing 11 by means such as snap fitting, welding, gluing, or screw locking. The optical module 100 of the first example embodiment improves an assembly structure of the fiber optic receptacles 43 by first assembling the fiber optic receptacles 43 as the fiber optic receptacle module 43a and then installing the entire module 43a onto the housing 10, thus facilitating the assembly of the fiber optic receptacles 43, and effectively increasing assembly efficiency.

As shown in FIG. 2, in the first example embodiment, after being installed at the optical interface 13 of the housing 10, the fiber optic receptacle module 43a is locked tightly against the optical interface 13 to secure the fiber optic receptacles 43 at the optical interface 13 by means of a position limiting card 45 arranged behind the fiber optic receptacle module 43a. Specifically, first engaging members are respectively arranged on two opposite sides of the position limiting card 35. Second engaging members are arranged inside the housing 10. The position limiting card 45 is installed in the housing 10 by means of cooperation between the first engaging members and the second engaging members. In the embodiment shown in FIGS. 2 through 4, the first engaging members are protruding edges 451 (two protruding edges 451 are shown in FIG. 3, while only one protruding edge 451 is shown in FIG. 4) respectively disposed on the two opposite sides of the position limiting card 45. The second engaging members are guide grooves 151 respectively disposed on two opposite side walls 15 (only one side wall 15 and one guide groove 151 are shown in FIG. 2) of the lower housing 11. After the front end of the fiber optic receptacle module 43a is inserted into the optical interface 13 of the housing 10, the position limiting card 45 is inserted into the housing 10. The cooperation between the protruding edges 451 of the position limiting card 45 and the guide grooves 151 of the side walls 15 of the lower housing 11 limits the position of the position limiting card 45 so as to lock the fiber optic receptacle module 43a tightly against the optical interface 13. As a result, the position of the fiber optic receptacle module 43a is limited to be between the optical interface 13 of the housing 10 and the position limiting card 45, thus completing the installation and securing the fiber optic receptacle module 43a. In order to facilitate the fitting of the position limiting card 45, a chamfer may be arranged at a lower end of each protruding edge 451 of the position limiting card 45 and a corresponding chamfer (not illustrated in the drawings) may be arranged at an upper end of each guide groove 151 of the side walls 15 of the lower housing 11, respectively, to guide a smooth fitting of the position limiting card 45 into the lower housing 11. Alternatively, in other example embodiments, guide grooves may be arranged on the position limiting card 45 and protruding edges may be arranged inside the side walls 15 of the lower housing 11 so that the position limiting card 45 fits into place by means of cooperation between the guide grooves and protruding edges. The position limiting card 45 limits the position of the fiber optic receptacle module 43a, thus resulting in convenient and fast assembly, higher assembly efficiency, and easier replacement and repair. In other example embodiments, the fiber optic receptacle module 43a may also be secured and installed at the optical interface 13 of the housing 10 by other means such as gluing, welding, or screw locking instead of the position limiting card 45 that limits the position of the fiber optic receptacle module 43a.

As shown in FIGS. 3 through 6, in the first example embodiment, the fiber optic receptacle module 43a further includes a main plate 44. The plurality of fiber optic receptacles 43 are secured to the main plate 44 so that the fiber optic receptacles 43 are connected together side-by-side or in a matrix. As shown in FIG. 6, the main plate 44 includes a front plate surface 441 and a back plate surface 442. The front plate surface 441 is disposed closer to the optical interface 13, and the back plate surface 442 is disposed away from the optical interface. A plurality of insertion holes 443 that extend from the front plate surface 441 to the back plate surface 442 are arranged in the main plate 44. The receptacle front ends 431 of the plurality of fiber optic receptacles 43 fit through their respectively corresponding insertion holes 443 and are arranged at the optical interface 13. Position limiting steps 433 are arranged on the receptacle back ends 432 of the fiber optic receptacles 43. Step surfaces of the position limiting steps 433 abut against the back plate surface 442 of the main plate 44. As shown in FIGS. 5 and 6, snap-fit claws 46 extending backwards (towards the electrical interface 14 of the housing 10) are arranged on the main plate 44, and claw hooks 461 are arranged at far ends of the snap-fit claws 46. The claw hooks 461 snap-fit to back end surfaces 437 of the fiber optic receptacles 43 to secure the fiber optic receptacles 43 to the main plate 44 and cause the fiber optic receptacles 43 to be connected together side-by-side or in a matrix. In other example embodiments, the fiber optic receptacles 43 may also be secured to the main plate 44 by means such as welding or gluing.

As shown in FIGS. 3 and 4, the position limiting card 45 includes a plurality of clearance openings 452 to provide clearance for the optical fibers 41 connected to the fiber optic receptacles 43. Support arms 453 between the clearance openings 452 protrude forward (towards the optical interface 13 of the housing 10) and abut against the back end surfaces 437 of the fiber optic receptacles 43 to fit the fiber optic receptacle module 43*a* tightly against the optical interface 13 of the housing 10. In order to facilitate the fitting of the position limiting card 45, chamfers 455 may be arranged at lower ends of portions of the support arms 453 protruding forward to guide a smooth fitting of the position limiting card 45 to the back of the fiber optic receptacle module 43*a*.

In some optical module packages, an end surface of the fiber optic insertion core 436 in the fiber optic receptacle 43 may be configured as an inclined surface for purposes such as reducing optical return losses. Therefore, the fiber optic receptacle 43 inside the fiber optic receptacle module 43*a* needs to be inserted into the optical interface 13 at a certain orientation, and the fiber optic receptacle 43 is not allowed to rotate. Therefore, in the first example embodiment, a first internal orienting structure is arranged in each of the insertion holes 443 of the main plate 44 of the fiber optic receptacle module 43*a*. Correspondingly, a second internal orienting structure is arranged on an outer wall of each of the fiber optic receptacles 43. The second internal orienting structures and the first internal orienting structures cooperate to define the orientation of the fiber optic receptacles 43 and to prevent the fiber optic receptacles 43 from rotating. Specifically, as shown in FIGS. 4 and 6, a protrusion 444 is arranged in each of the insertion holes 443 of the main plate 44, and a groove 434 is arranged on an outer wall of each of the fiber optic receptacles 43. In other words, the first internal orienting structure is the protrusion 444, and the second internal orienting structure is the groove 434. When the fiber optic receptacles 43 are inserted into the insertion holes 443, the insertion can be performed successful only if the grooves 434 are aligned with the protrusions 444, and the inclined end surfaces of the fiber optic insertion cores 436 are oriented at a desired angle only if the grooves 434 are aligned with the protrusions 444. Once inserted into the insertion holes 443, the fiber optic receptacles 43 cannot rotate anymore so that the inclined surfaces of the fiber optic insertion cores 436 are locked at a designated orientation. In other example embodiments, grooves may also be arranged in the insertion holes 443, and protrusions may also be arranged on the outer walls of the fiber optic receptacles 43. Still alternatively, cooperative orienting structures of other shapes may be used.

In a parallel multi-channel optical module, fiber optic receptacles 43 may be connected separately to an optical receiver chip and an optical transmitter chip so that the fiber optic receptacles 43 are used separately for outputting optical signals and inputting optical signals. Therefore, the positions of the fiber optic receptacles 43 in the fiber optic receptacle module 43*a* are not interchangeable. In other words, the fiber optic receptacles are arranged on the fiber optic receptacle module 43*a* in a certain order. Also, the left-right orientation is set and cannot be reversed when the fiber optic receptacle module 43*a* is being inserted into the optical interface. To facilitate assembly, in the first example embodiment, a first external orienting structure is arranged on the fiber optic receptacle module 43*a*. Correspondingly, a second external orienting structure is arranged on the housing 10. The second external orienting structure and the first external orienting structure cooperate to define the installation orientation of the fiber optic receptacle module 43*a*, thereby ensuring that the fiber optic receptacle module 43*a* is inserted into the optical interface 13 at the correct up-down and left-right orientation and preventing misplacement of the fiber optic receptacles 43 in the fiber optic receptacle module 43*a*. The first external orienting structure and the second external orienting structure may be a protrusion and a groove that cooperate with each other (not shown in the drawings). For example, a groove may be arranged at a bottom or on a side wall of the housing 10, and a protrusion may be arranged at a bottom or on a side wall of the fiber optic receptacle module 43*a*.

As shown in FIGS. 3 through 5, in order to improve the electromagnetic interference (EMI) performance of the optical module 100, an electromagnetic shielding plate (e.g., an electrically conductive elastic plate 50) is arranged between the optical interface 13 and the fiber optic receptacle module 43*a*, and electromagnetic shielding strips such as electrically conductive glue fill assembly gaps between the upper lid 12 and the side walls 15 of the lower housing 11. Thus, the lower housing 11, upper lid 12, electromagnetic shielding plate, and electromagnetic shielding strips together form a small sealed cavity inside the optical module 100, which is capable of effectively protecting against and reducing electromagnetic leaks and improving EMI performance for the optical module. In the first example embodiment, the electromagnetic shielding plate is the electrically conductive elastic plate 50. For example, the electrically conductive elastic plate 50 can be made of electrically conductive foam or electrically conductive rubber. The electrically conductive elastic plate 50 has a plurality of through holes 51. During assembly, the electrically conductive elastic plate 50 is placed over the receptacle front ends 431 of the fiber optic receptacles 43 so that the electrically conductive elastic plate 50 tightly touches the front plate surface 441 of the main plate 44 of the fiber optic receptacle module 43*a*. Then, the electrically conductive elastic plate 50, together with the fiber optic receptacle module 43*a*, is assembled to the optical interface 13 of the housing 10. The electrically conductive elastic plate 50 is stretchable and compressible to a certain extent, and the size of the electrically conductive elastic plate 50 is slightly larger than the size of a cross-sectional area of an internal space of the housing 10 formed upon assembly of the lower housing 11 and the upper lid 12, thus causing the electrically conductive elastic plate 50 to have an interference fit with the housing 10 and to fill gaps between the fiber optic receptacle module 43*a* and the optical interface 13, lower housing 11, and upper lid 12. Additionally, the size of the through holes 51 on the electrically conductive elastic plate 50 is slightly smaller than the size of the front ends of the fiber optic receptacles 43, thus causing the through holes 51 of the electrically conductive elastic plate 50 to have an interference fit with the fiber optic receptacles 43 so that gaps between the fiber optic receptacles 43 and the insertion holes 443 of the main plate 44 are fully filled, thereby filling all gaps at the optical interface 13 at the front end of the optical module 100 and effectively improving the EMI performance of the optical module 100.

In commonly used parallel multi-channel optical modules, the structure is designed so that the upper lid 12 and the lower housing 11 cooperate to hold the fiber optic receptacles 43 in place. As a result, addition of electromagnetic shielding at the receptacle front ends 431 of the fiber optic receptacles 43 is inconvenient, assembly is cumbersome, and good sealing performance cannot be achieved. In the first example embodiment of the present disclosure, the structure is designed so that fiber optic receptacles 43 form the module 43a first, and then the entire module 43a is installed onto the housing 10. This allows the electrically conductive elastic plate 50 to be conveniently placed over the front of the fiber optic receptacle module 43a after the assembly of the fiber optic receptacle module 43a is completed. Then the electrically conductive elastic plate 50, together with the fiber optic receptacle module 43a, is assembled to the optical interface 13 of the housing 10. Therefore, assembly of an electromagnetic shielding structure is convenient, and, at the same time, good electromagnetic sealing performance can be achieved.

Second Example Embodiment

Figure 7:
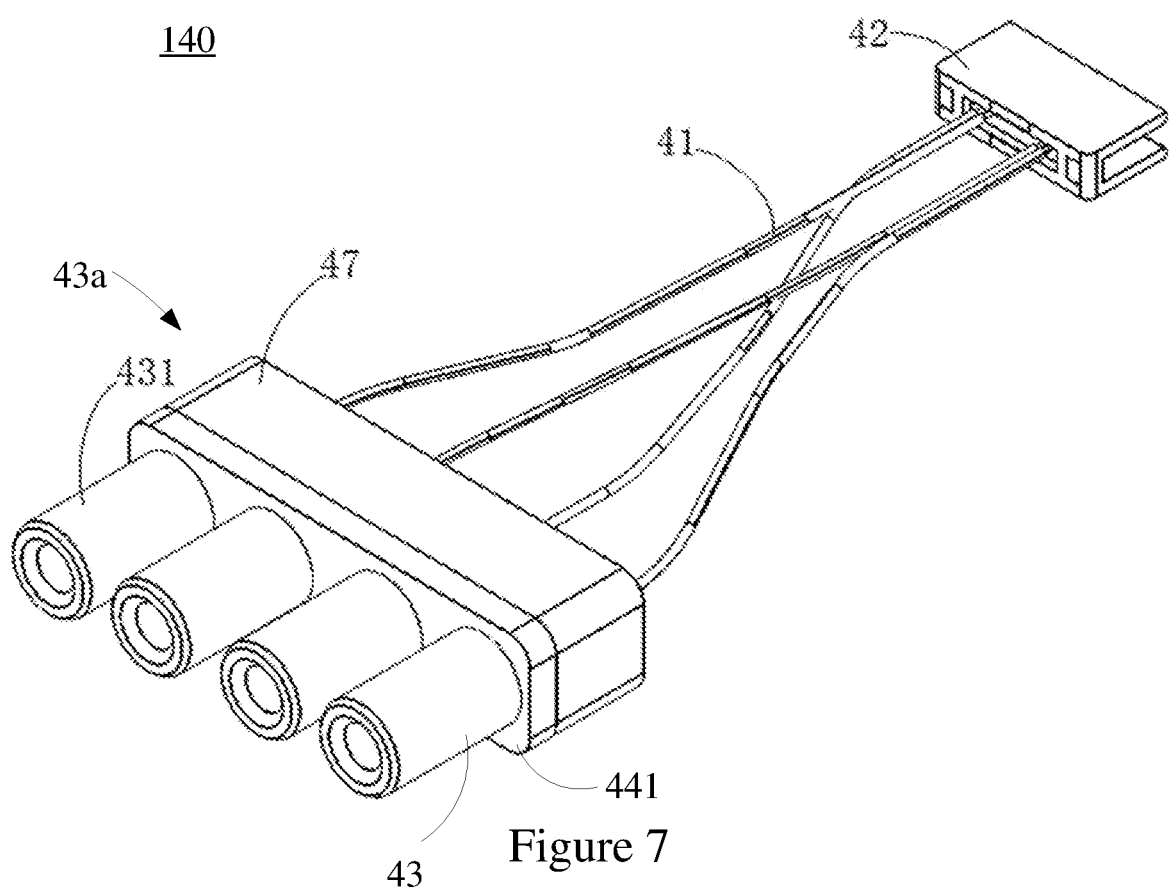
FIG. 7 is a schematic view illustrating another way of connection for fiber optic receptacles, consistent with a second example embodiment of the present disclosure.

FIG. 7 is a schematic view of a fiber optic assembly 140 inside an optical module consistent with a second example embodiment of the present disclosure. The second example embodiment differs from the first example embodiment in that the plurality of fiber optic receptacles 43 of the fiber optic receptacle module 43a in the optical module of the second example embodiment are a one-piece structure. The receptacle front ends 431 of the fiber optic receptacles 43 of the fiber optic receptacle module 43a are still hollow cylinders structures separated from each other or connected together side-by-side. Back ends of the fiber optic receptacles 43 are formed as a one-piece cuboid structure 47. A plurality of through holes (not shown in FIG. 7) are arranged on the cuboid structure 47. The receptacle front ends 431 of the fiber optic receptacles 43 respectively cooperate with the plurality of through holes arranged on the cuboid structure 47 so that the sleeves 435 and the fiber optic insertion cores 436 of the fiber optic receptacles 43 are assembled into the through holes arranged on the cuboid structure 47. During assembly, the fiber optic receptacle module 43a that is a one-piece structure is assembled as a whole to the optical interface 13 of the housing 10 and then secured and installed at the optical interface 13 of the housing 10 by other means such as gluing, welding, or screw locking. Alternatively, a position limiting card may be used to secure and install the fiber optic receptacle module 43a at the optical interface 13 of the housing 10.

Similarly, an electromagnetic shielding plate may be placed over the front plate surface 441 of the fiber optic receptacle module 43a, and then the fiber optic receptacle module 43a with the electromagnetic shielding plate may be installed to the optical interface 13 of the housing 10 to provide good electromagnetic shielding performance at the optical interface.

A first external orienting structure may also be arranged on a bottom surface or a side surface of the one-piece structure of the fiber optic receptacle module 43a. Correspondingly, a second external orienting structure may be arranged on the housing 10. The second external orienting structure and the first external orienting structure cooperate to define an installation orientation of the fiber optic receptacle module 43a, thereby ensuring that the fiber optic receptacle module 43a is inserted into the optical interface 13 at the correct up-down and left-right orientation and preventing misplacement of the fiber optic receptacles 43 in the fiber optic receptacle module 43a.

In other example embodiments, the plurality of fiber optic receptacles 43 of the fiber optic receptacle module 43a may also be connected together by means such as welding or gluing.

Third Example Embodiment

An optical module assembly method consistent with a third example embodiment of the present disclosure includes the following steps:

providing the circuit board module, the optoelectronic chip 31, the fiber optic receptacle module 43a, and the housing 10, wherein the fiber optic receptacle module 43a includes the plurality of fiber optic receptacles 43 connected together, and the housing 10 includes the lower housing 11 and the upper lid 12, and has the optical interface 13 and the electrical interface 14;

electrically connecting the optoelectronic chip 31 to the circuit board module, optically coupling the fiber optic receptacle module 43a to the optoelectronic chip 31, installing the circuit board module to an end of the lower housing 11 near the electrical interface 14, inserting the plurality of fiber optic receptacles 43 connected together into the optical interface 13, and securing the fiber optic receptacles 43 at the optical interface 13; and placing the upper lid 12 over the lower housing 11 to complete the packaging of the optical module 100.

In the steps of electrically connecting the optoelectronic chip 31 to the circuit board module, optically coupling the fiber optic receptacle module 43a to the optoelectronic chip 31, installing the circuit board module to an end of the lower housing 11 near the electrical interface 14, inserting the plurality of fiber optic receptacles 43 connected together into the optical interface 13, and securing the fiber optic receptacles 43 at the optical interface 13, the sequence of assembly for the modules or components do not follow a defined sequence of assembly and may be adjusted based on actual needs.

In the third example embodiment, a method for connecting the plurality of fiber optic receptacles includes: providing the main plate 44 that has the plurality of insertion holes 443, and inserting the fiber optic receptacles 43 through their respectively corresponding insertion holes 443 to secure the fiber optic receptacles 43 onto the main plate 44. Here, the snap-fit claws 46 extending backwards are arranged on the main plate 44, and the claw hooks 461 are arranged at far ends of the snap-fit claws 46. The claw hooks 461 snap-fit to the back end surfaces 437 of the fiber optic receptacles 43 to secure the fiber optic receptacles 43 to the main plate 44 and form the fiber optic receptacle module 43a.

The securing method for securing the fiber optic receptacle module 43a at the optical interface 13 includes: providing the position limiting card 45, and fitting the position limiting card 45 into the housing 10 so that the fiber optic receptacle module 43*a* fits tightly against the optical interface 13 of the housing 10 to secure the fiber optic receptacle module 43*a* at the optical interface 13. A first position-limiting member is arranged on each of the two sides of the position limiting card 45, and a second position-limiting member is arranged inside each of the two side walls of the lower housing 11. The second position-limiting member cooperates with the first position-limiting member to limit the position of the position limiting card 45 so that the position limiting card 45 fits tightly against the fiber optic receptacle module 43*a*.

In the optical module assembly method, before the fiber optic receptacle module 43*a* is installed at the optical interface 13, an electromagnetic shielding plate (e.g., the electrically conductive elastic plate 50) may also be placed over the front end of the fiber optic receptacle module 43*a*, and then the fiber optic receptacle module 43*a* is installed at the optical interface 13 so that the electromagnetic shielding plate is installed between the optical interface 13 and the fiber optic receptacle module 43*a* and fills all gaps between the optical interface 13 and the fiber optic receptacle module 43*a*, thus achieving good electromagnetic shielding performance at the front end of the optical module 100.

The structures or methods in the aforementioned example embodiments are adapted for small-form pluggable optical modules in QSFP packages, and the methods for assembling the optical interface and the optical fiber module are adapted for CS optical interfaces. The structures or methods are also adapted for optical modules and optical interfaces of other models.

The aforementioned example embodiments used the example of a fiber optic assembly where fiber optic receptacles are coupled to an optoelectronic chip by means of optical fibers. In other example embodiments, fiber optic receptacles may also be directly coupled to an optoelectronic chip. In other words, the fiber optic receptacles and the optoelectronic chip are assembled into a pluggable optical sub-module, and then the optoelectronic chip is connected to the aforementioned circuit board by means of a flexible printed circuit board (FPC), thus realizing an electrical connection between the optoelectronic chip and the circuit board.

The embodiments of present disclosure provide the following benefits. The assembly structure of fiber optic receptacles of an optical module is improved by first forming a module with the fiber optic receptacles and then installing the entire module into the housing, thus facilitating the assembly of the fiber optic receptacles and effectively increasing assembly efficiency. The use of electromagnetic sealing measures is facilitated, and thus the electromagnetic sealing performance of the assembly is effectively improved.

The series of detailed descriptions above is only intended to provide specific descriptions of feasible embodiments of the present disclosure. They are not to be construed as limiting the scope of protection for the present disclosure; all equivalent embodiments or changes that are not detached from the techniques of the present disclosure in essence should fall under the scope of protection of the present claims.

What is claimed is:

1. An optical module comprising:
   a housing comprising an optical interface;
   a circuit board module disposed in the housing;
   a fiber optic receptacle module disposed in the housing and comprising a plurality of fiber optic receptacles; and
   an optoelectronic chip disposed in the housing and electrically connected to the circuit board module,
   wherein the plurality of fiber optic receptacles are connected together and installed at the optical interface,
   the fiber optic receptacle module further comprises a main plate, and the plurality of fiber optic receptacles are secured to the main plate, and
   snap-fit claws extending backwards are arranged on the main plate, claw hooks are arranged at far ends of the snap-fit claws, and the claw hooks snap-fit to back end surfaces of the fiber optic receptacles to secure the fiber optic receptacles to the main plate.

2. The optical module of claim 1, wherein each of the fiber optic receptacles comprises an outer tube and a fiber optic insertion core disposed in the outer tube.

3. The optical module of claim 2, wherein the optical interface comprises a plurality of through holes respectively corresponding to the outer tubes of the fiber optic receptacles, and front ends of the outer tubes fit through the through holes.

4. The optical module of claim 3, wherein the optical module further comprises a position limiting card disposed behind the fiber optic receptacle module to fit the fiber optic receptacle module tightly against the optical interface.

5. The optical module of claim 4, wherein first engaging members are respectively arranged on two opposite sides of the position limiting card, and second engaging members are arranged inside the housing, and
   the position limiting card is installed in the housing by means of cooperation between the first engaging members and the second engaging members.

6. The optical module of claim 4, wherein the position limiting card comprises a plurality of clearance openings to provide clearance for far ends of the fiber optic receptacles or optical fibers that connect to the fiber optic receptacles.

7. The optical module of claim 1, wherein a first external orienting structure is arranged on the fiber optic receptacle module, and a second external orienting structure is arranged on the housing, and
   the second external orienting structure and the first external orienting structure cooperate to define an installation orientation of the fiber optic receptacle module.

8. The optical module of claim 1, wherein the fiber optic receptacle module is installed at the optical interface of the housing by means of gluing, welding, or screw locking.

9. The optical module of claim 1, wherein
   the main plate comprises a front plate surface and a back plate surface, the front plate surface is near the optical interface, the back plate surface is away from the optical interface, a plurality of insertion holes that extend through the front plate surface and back plate surface are arranged on the main plate;
   the fiber optic receptacles fit through the insertion holes and are arranged in the optical interface; and
   position limiting steps are arranged on back ends of the fiber optic receptacles, and step surfaces of the position-limiting steps abut against the back plate surface.

10. The optical module of claim 9, wherein a first internal orienting structure is arranged in the insertion holes, and a second internal orienting structure is arranged on outer walls of the fiber optic receptacles, and
    the second internal orienting structure and the first internal orienting structure cooperate to define the orientation of the fiber optic receptacles.

11. The optical module of claim 1, wherein the plurality of fiber optic receptacles of the fiber optic receptacle module are connected together by means of welding or gluing.

12. The optical module of claim 1, wherein the optical interface and the housing are a one-piece structure, or
the optical interface is secured and installed at the housing.

13. The optical module of claim 1, wherein an electromagnetic shielding plate is arranged between the optical interface and the fiber optic receptacle module.

14. The optical module of claim 13, wherein the electromagnetic shielding plate is an electrically conductive elastic plate, the electrically conductive elastic plate having a plurality of through holes, and front ends of the fiber optic receptacles fit through and have an interference fit with the through holes.

15. An optical module assembly method, comprising:
providing a circuit board module, an optoelectronic chip, a fiber optic receptacle module, and a housing, the fiber optic receptacle module comprising a plurality of fiber optic receptacles connected together, and the housing comprising a lower housing and an upper lid and having an optical interface and an electrical interface;
electrically connecting the optoelectronic chip to the circuit board module, optically coupling the fiber optic receptacle module to the optoelectronic chip, installing the circuit board module to an end of the lower housing near the electrical interface, inserting the plurality of fiber optic receptacles connected together into the optical interface, and securing the fiber optic receptacles at the optical interface; and
after securing the fiber optic receptacles at the optical interface, placing the upper lid over the lower housing;
the method further comprising:
connecting the plurality of fiber optic receptacles, the connecting comprising:
providing a main plate that has a plurality of insertion holes, and inserting the plurality of the fiber optic receptacles through the insertion holes; and
arranging snap-fit claws extending backwards on the main plate, arranging claw hooks at far ends of the snap-fit claws, and snap-fitting the claw hooks to back end surfaces of the fiber optic receptacles to secure a plurality of the fiber optic receptacles to the main plate.

* * * * *